(No Model.)

Z. L. WHEELER.
THILL COUPLING.

No. 602,710. Patented Apr. 19, 1898.

WITNESSES:
Otto Spieth.
Isaac B. Owens

INVENTOR
Z. L. Wheeler
By Munn
ATTORNEYS.

UNITED STATES PATENT OFFICE.

ZADOC L. WHEELER, OF CEDAR FALLS, IOWA.

THILL-COUPLING.

SPECIFICATION forming part of Letters Patent No. 602,710, dated April 19, 1898.

Application filed August 27, 1897. Serial No. 649,709. (No model.)

*To all whom it may concern:*

Be it known that I, ZADOC L. WHEELER, of Cedar Falls, in the county of Black Hawk and State of Iowa, have invented a new and Improved Thill-Coupling, of which the following is a full, clear, and exact description.

This invention is a thill-coupling having a clip to embrace the axle and a pin to hold the eye of the thill, the pin being passed through eyes on the clip and being held in place by a peculiarly-arranged spring.

This specification is the disclosure of one form of my invention, while the claim defines the actual scope of the conception.

Reference is to be had to the accompanying drawings, forming a part of this specification, in which similar characters of reference indicate corresponding parts in both the figures.

Figure 1:
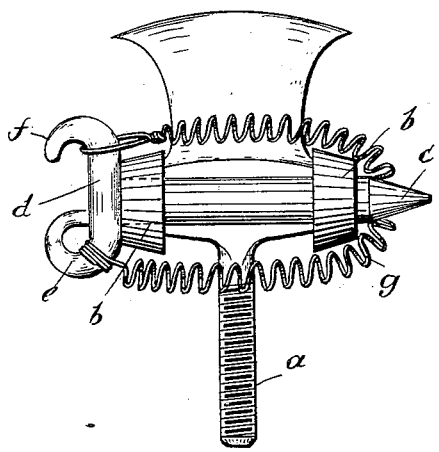
Figure 2:
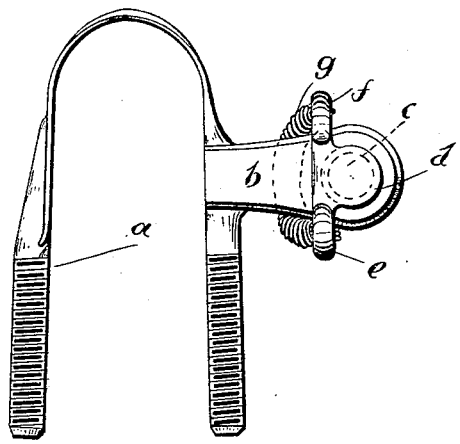

Figure 1 is a front elevation of the invention, and Fig. 2 is a side elevation thereof.

The clip $a$ has two forwardly-projecting and transversely-alined eyes $b$. Between the eyes $b$ the eye of the thill is located and held to swing in such position by means of the pin $c$.

The pin $c$ has a head $d$, provided with an upturned end $e$, forming an eye, and an upturned end $f$, forming a hook. Securely fastened in the eye of the head $d$ is one end of a retractile spiral spring $g$. The spiral spring $g$ is passed around the eye $b$ that is opposite the head $d$ and thence horizontally to the hook $f$, with which it is engaged by a loop formed on the remaining or free end of the spring.

The pin $c$ may be readily placed or displaced by detaching the loop on the spring $g$ from the hook of the head $d$. When the spring is passed around the eyes $b$ and connected at both ends with the head $d$, the pin $c$ is immovably held in place and at the same time prevented from such loose movement as will cause the coupling to rattle. The spring may be readily disconnected from the hook of the head $d$, owing to the resiliency of the spring.

Having thus described my invention, I claim as new and desire to secure by Letters Patent—

A thill-coupling having a clip with two transversely-alined eyes thereon, a pin passed through the eyes and having a head with two upbent ends, one end forming an eye and the other end forming a hook, and a retractile spring one end of which is permanently engaged with the eye on the head of the pin and the other end of which has a loop capable of removable engagement with the hook on the head of the pin.

ZADOC L. WHEELER.

Witnesses:
THEODORE BOEHMLER,
HARRY WYTH.